US011359729B1

(12) United States Patent
Mason et al.

(10) Patent No.: US 11,359,729 B1
(45) Date of Patent: Jun. 14, 2022

(54) 3-WAY T-FLOW BALL DRAIN VALVE

(71) Applicant: NIBCO Inc., Elkhart, IN (US)

(72) Inventors: Christopher W. Mason, Granger, IN (US); Lisa Lyon, North Grafton, MA (US); Andrew J. Terry, Sturbridge, MA (US)

(73) Assignee: NIBCO Inc., Elkhart, IN (US)

( * ) Notice: Subject to any disclaimer, the term of this patent is extended or adjusted under 35 U.S.C. 154(b) by 0 days.

(21) Appl. No.: 17/126,272

(22) Filed: Dec. 18, 2020

(51) Int. Cl.
*F16K 5/06* (2006.01)
*F16K 11/087* (2006.01)

(52) U.S. Cl.
CPC ........ *F16K 5/0605* (2013.01); *F16K 11/0873* (2013.01)

(58) Field of Classification Search
CPC .. F16K 11/0873; F16K 5/0605; F16K 27/067; Y10T 137/87877; Y10T 137/8782
USPC .......................................................... 137/883
See application file for complete search history.

(56) References Cited

U.S. PATENT DOCUMENTS

| 7,631,662 | B2 * | 12/2009 | Reck ........................ F16K 11/22 122/14.3 |
| 7,681,596 | B2 | 3/2010 | Reck |
| 8,375,991 | B2 * | 2/2013 | Erhardt .................... F24H 9/122 137/625.47 |
| 2010/0252129 | A1 * | 10/2010 | Olsen ....................... F16K 24/02 137/597 |
| 2011/0073201 | A1 * | 3/2011 | Matsui .................. F16K 27/067 137/561 R |
| 2018/0259076 | A1 * | 9/2018 | Feng ..................... F16K 5/0605 |

FOREIGN PATENT DOCUMENTS

| CN | 203395270 | 1/2014 |
| CN | 106958670 | 7/2017 |
| JP | 2020097902 | 6/2020 |

OTHER PUBLICATIONS

The Plumber's Choice, "1-1/4 in x 2 in SWT high flow drain ball valve, purge for pipe cleanout, 3-way adjustable flow path, brass," https://www.homedepot.com/p/The-Plumber-s-Choice . . . (Oct. 9, 2020).
Watts, "Series RPVM-1-Press residential purge," flier, Watts.com (2020).
Webstone, "Propal Series," Ball Drain Valve brochure, Webstone Company, Inc. (2016).

* cited by examiner

*Primary Examiner* — Michael R Reid
(74) *Attorney, Agent, or Firm* — Price Heneveld LLP

(57) ABSTRACT

A 3-way T-flow ball drain valve permits the draining/filling/purging of a hydronic or plumbing system at the end of the line. This permits the orientation of a drain port in either horizontal or vertical position while permitting end of line draining. A drain valve member is positioned to permit the opening of the drain port when the T-ball valve member in the tee-shaped valve body has been open to permit flow toward the drain port.

20 Claims, 5 Drawing Sheets

3-WAY T-FLOW BALL DRAIN VALVE

BACKGROUND OF THE INVENTION

The present invention relates generally to isolation valves and, more particularly, to isolation valves with drain ports. Isolation valves are traditionally used in plumbing and hydronic applications to control the flow of water and/or other fluid to and from an in-line appliance or piece of equipment for purposes of maintaining, replacing, or repairing the appliance of equipment. For example, the isolation valves can be closed and the flow of water or other fluid to and/or from an in-line appliance or piece of equipment can be closed off, permitting the maintenance, replacement, or repair of such appliance/equipment. However, the maintenance, replacement, or repair of appliances/equipment sometimes requires the draining or partial draining of water or other fluid from the system. The draining of water or fluid can reduce the pressure and/or fluid level prior to maintenance, replacement, or repair.

Thus, an isolation valve that permits the draining, filling, and/or purging from the end of a line would be advantageous.

SUMMARY OF THE INVENTION

One aspect of the present invention is an isolation valve that has a tee-shaped valve body. The tee-shaped valve body has a first fitting end, a second fitting end, and a drain port. The second fitting end is disposed approximately 90° from the first fitting end and approximately 90° from the drain port. The drain port is a located approximately 180° from the first fitting end. The isolation valve includes a first valve member with a flow diversion member located in the fluid passageway of the tee-shaped valve body. When the first valve member is in a first position, the fluid passageway between the first fitting end and the second fitting end is opened, while the fluid passageway between the drain port and the first fitting end and second fitting end is closed. When the first valve member is in the second position, the fluid passageway between the second fitting end and the both the first fitting end and the drain port is closed, while the fluid passageway is opened between the first fitting end and the drain port. When the first valve member is in a third position, the fluid passageway between the first fitting end and both the second fitting end and the drain port is closed, while the fluid passageway between the second fitting end and the drain port is opened. The isolation valve includes a second valve member with a flow diversion member located in the fluid passageway between the first valve member and the drain port.

Yet another aspect of the present invention is a T-ball valve assembly. The T-ball valve assembly includes a tee-shaped valve body having a first fitting end, a second fitting end, and a drain port. The second fitting end is in the middle of the tee-shaped valve body, while the first fitting end and the drain port are on opposite sides of the tee-shaped valve body. A T-ball valve member has a flow diversion member located in the fluid passageway of the tee-shaped valve body. The T-ball valve member opens the fluid passageway between the first fitting end and the second fitting end, while close the fluid passageway between the drain port and both the first fitting end and second fitting end when the T-ball valve member is in the first position. When the T-ball valve is in the second position, the fluid passageway between the second fitting end and both the first fitting end and the drain port is closed, while the fluid passageway between the first fitting end and the drain port is opened. When the T-ball valve member is in a third position, the fluid passageway between the first fitting end and both the second fitting end and the drain port is closed, while the fluid passageway between the second fitting end and the drain port is opened. The T-ball valve assembly includes a second valve member with a flow diversion member located in the fluid passageway between the T-ball valve member and the end of the drain port.

Yet another aspect of the present invention is a piping assembly with a T-ball valve. The T-ball valve includes a tee-shaped valve body having a first fitting end, a second fitting end, and a drain port. The second fitting end is in the middle of the tee-shaped valve body, while the first fitting end and the drain port are on opposite sides of the tee-shaped valve body. A T-ball valve member has a flow diversion member located in the fluid passageway of the tee-shaped valve body. The T-ball valve member opens the fluid passageway between the first fitting end and the second fitting end, while close the fluid passageway between the drain port and both the first fitting end and second fitting end when the T-ball valve member is in the first position. When the T-ball valve is in the second position, the fluid passageway between the second fitting end and both the first fitting end and the drain port is closed, while the fluid passageway between the first fitting end and the drain port is opened. When the T-ball valve member is in a third position, the fluid passageway between the first fitting end and both the second fitting end and the drain port is closed, while the fluid passageway between the second fitting end and the drain port is opened. The T-ball valve assembly includes a second valve member with a flow diversion member located between the T-ball valve member and the end of the drain port. The piping assembly includes a first pipe coupled to the first fitting end and a second pipe coupled to the second fitting end.

These and other features, advantages, and objects of the present invention will be further understood and appreciated by those skilled in the art by reference to the following specification, claims, and appended drawings.

DETAILED DESCRIPTION

Figure 1:
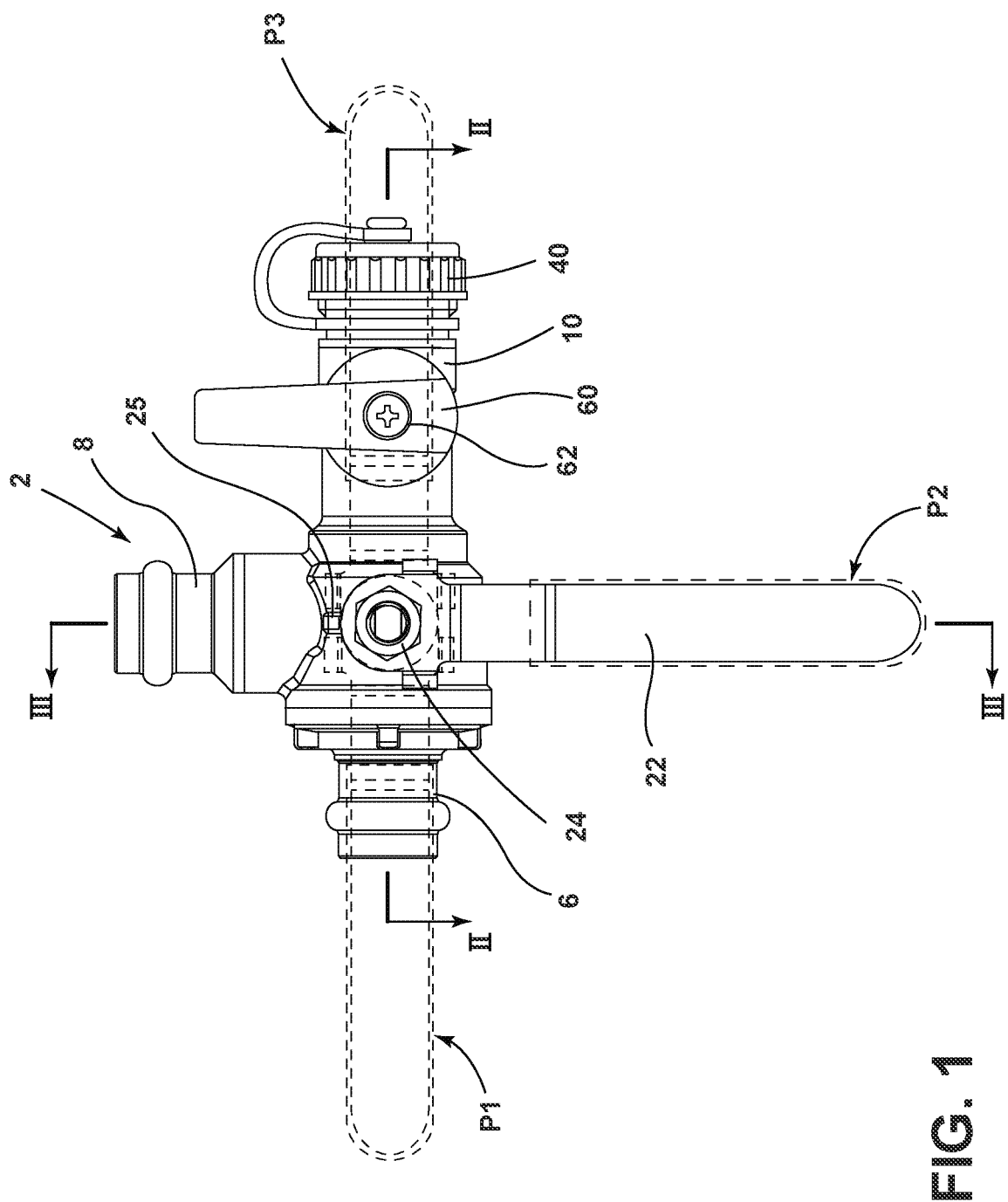
FIG. 1 is a top view of one embodiment of a 3-way T-flow ball drain valve illustrating different positions of the valve handle.
Figure 2:
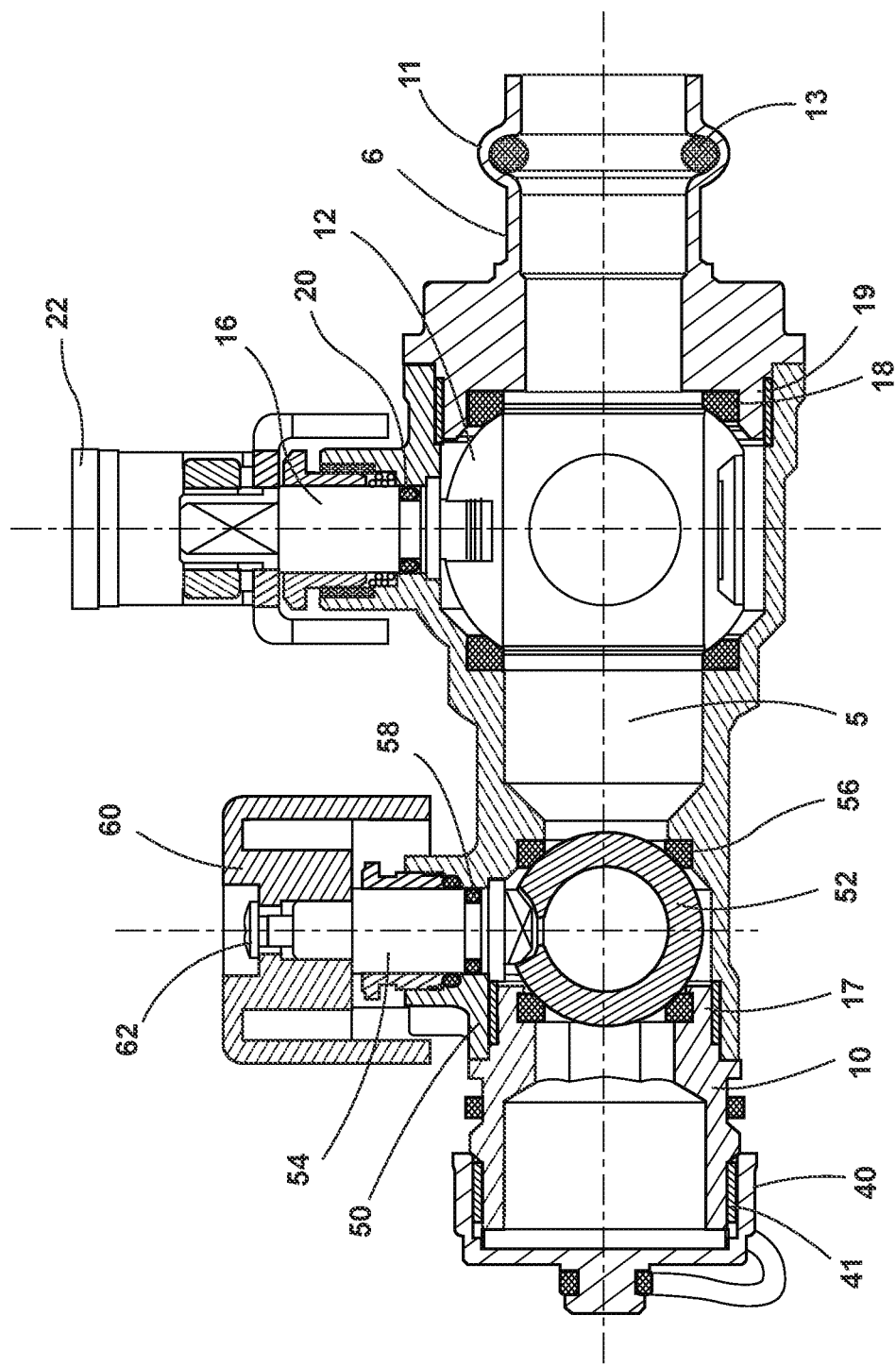
FIG. 2 is a cross-sectional view of the 3-way T-flow ball drain valve shown in FIG. 1, taken along line II-II.
Figure 3:
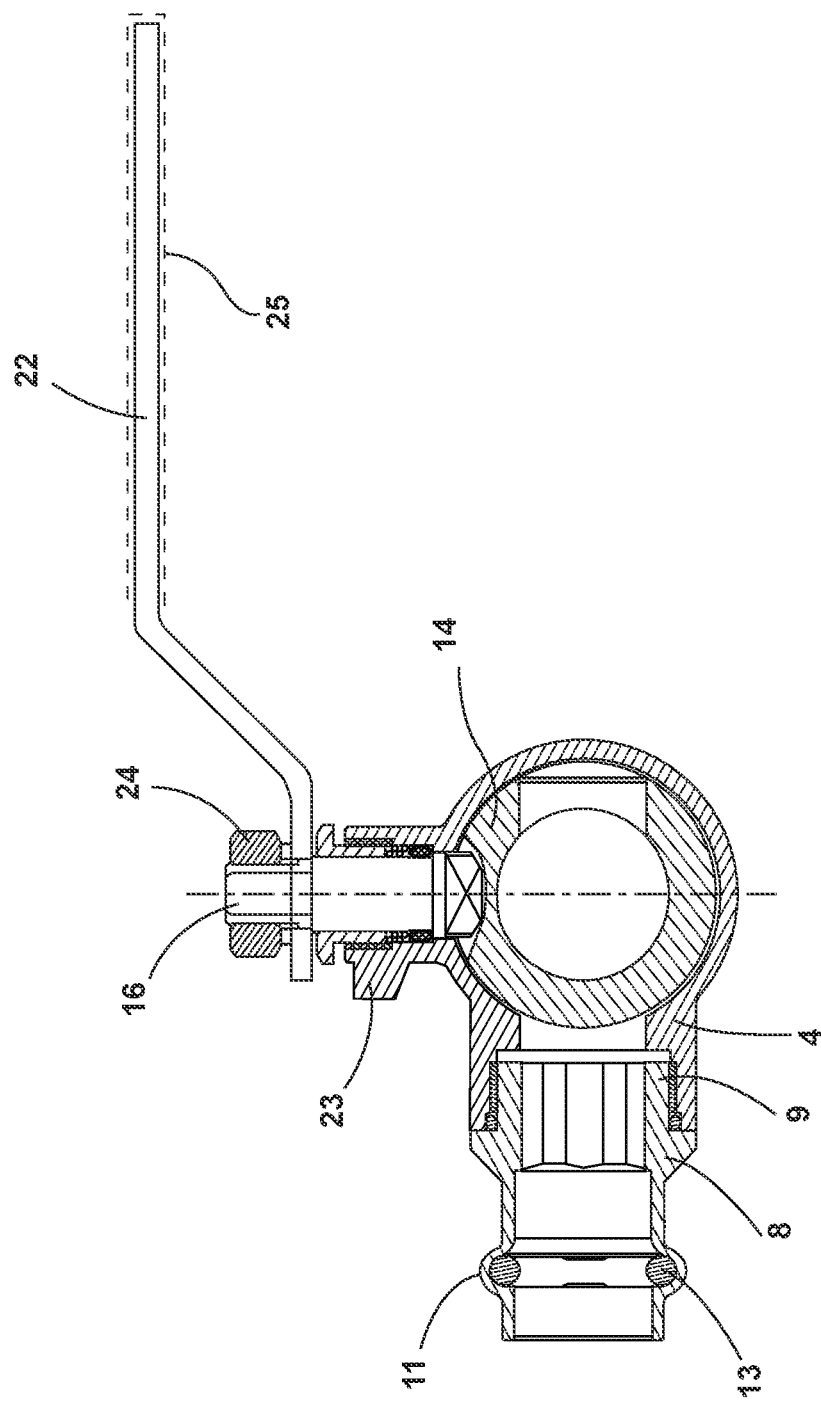
FIG. 3 is a cross-sectional view of the 3-way T-flow ball drain valve shown in FIG. 1, taken along line III-III.

For purposes of description herein, the terms "upper," "lower," "right," "left," "rear," "front," "vertical," "horizontal," and derivatives thereof shall relate to the invention as oriented in FIGS. 1-3. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

An isolation valve assembly 2 is illustrated in FIG. 1. The isolation valve assembly 2 includes a tee-shaped valve body 4 defining a fluid passageway 5. The tee-shaped valve body 4 has a first fitting end 6, a second fitting end 8, and a drain port 10. As illustrated in the Figures, the second fitting end 8 is in the middle section of the tee-shaped valve body 4, thus placing it at approximately 90° from the first fitting end 6 and the drain port 10. The first fitting end 6 and the drain port 10 are approximately 180° apart as they are on opposite sides of the tee-shaped valve body 4.

The isolation valve assembly 2 includes a first valve member 12. The first valve member 12 includes a ball 14 that is positioned within the fluid passageway 5 at the intersection of the first fitting end 6, the second fitting end 8, and the drain port 10, as illustrated in FIGS. 1 and 2. Seals 18 are positioned between the ball 14 and the tee-shaped valve body 4. The seals 18 help prevent flow or fluid between the ball 14 and the tee-shaped valve body 4. The first valve member 12 also includes a stem 16 that is coupled to the ball 14. The stem 16 can be coupled to a handle 22 by fixing a nut 24 to the stem 16. The handle 22 can include a cover or coating 25.

The first fitting end 6 and the second fitting end 8 can be any type of fitting end. In the illustrated embodiments, the first fitting end 6 and the second fitting end 8 are press fittings with an O-ring 13 that is positioned with an O-ring groove 11. Alternative fittings that can be used in the first fitting end 6 and/or the second fitting end 8 include male pipe thread, female pipe thread, traditional solder, PEX, push-to-connect, press-to-connect, fusion, compression, etc.

The drain port 10 includes a cap 40 that can be sealed to the drain port 10 by a seal 41, as illustrated in FIG. 2. Alternatively, the drain port 10 can include a threaded surface (not shown) that can be received on a threaded surface (not shown) on cap 40. The threaded surface of the drain port 10 can be coupled to a hose to assist in the draining/filling/purging of the valve assembly 2 and the surrounding plumbing components.

A drain valve member 50 can be used in the drain port 10. The drain valve member 50 can be positioned between the cap 40 and the first valve member 12, as illustrated in FIG. 2. The drain valve member 50 includes a ball 52 that is positioned in the fluid passageway 5 of drain port 10. Seals 56 can be positioned between the ball 52 and the tee-shaped valve body 4, as illustrated in FIG. 2. The drain valve member 50 includes a stem 54 that is coupled to ball 52. One or more stem seals 58 can be used to seal the stem 54 to the stem opening in the tee-shaped valve body 4. Stem 54 can also be coupled to a handle 60 by fastener 62.

In the illustrated embodiment, the drain port 10 and the first fitting end 6 are not integrally formed as part of the tee-shaped valve body 4. Rather, the drain port 10 includes a bonnet 17 that is connected to the tee-shaped valve body 4, and the first fitting end 6 can include a bonnet 19 that is connected to the tee-shaped valve body 4. Alternatively, the first fitting end 6, the second fitting end 8, and the drain port 10 can be formed as part of a single piece, tee-shaped valve body 4.

The first valve member 12 has three different positions. In position number 1, designated P1 on FIG. 1, the ball 14 and the first valve member 12 will permit flow through both the first fitting end 6 and the second fitting end 8 while blocking flow to the drain port 10. When the first valve member 12 is in a second position (P2), the first valve member 12 permits flow between first fitting end 6 and drain port 10, while blocking flow to and from the second fitting end 8. Thus, in position P2, the fluid passageway 5 is blocked to the second fitting end 8. When the first valve member 12 is in the third position (P3), the fluid passageway 5 is open from second fitting end 8 to drain port 10, while blocking flow to first fitting end 6.

In the illustrated embodiment, the ball 14 of first valve member 12 is a T-ball with three openings in the ball 14. The three openings in the ball 14 are in a T pattern, with the middle of the openings located at approximately 90° from the other two openings. The side of the ball 14 that has no opening will be positioned toward the drain port 10 when the first valve member 12 is in the first position (P1), toward the second fitting end 8 when the first valve member 12 is in the second position (P2), and toward the first fitting end 6 when the first valve member 12 is in the third position (P3).

Figure 4:
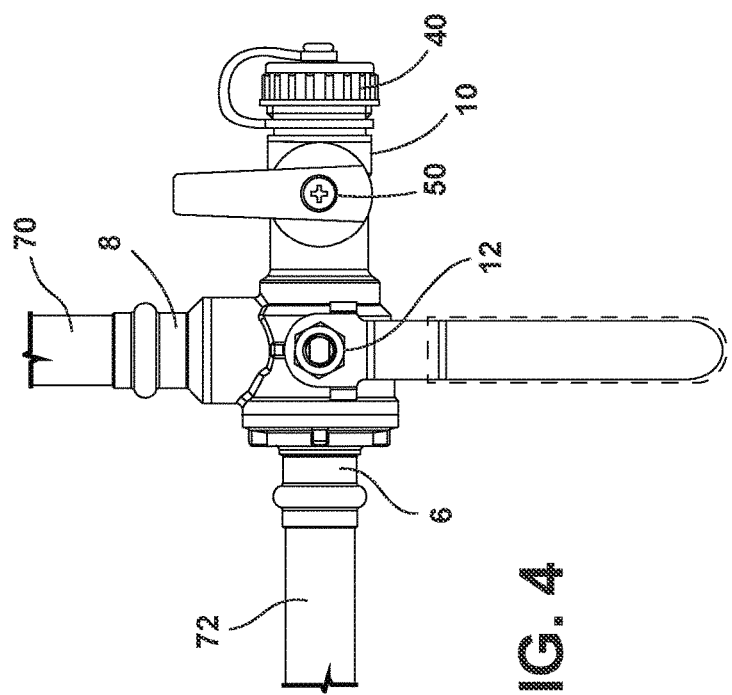
FIG. 4 is a front view of the 3-way T-flow ball drain valve of FIG. 1 shown connected to pipes, with the drain port in a generally horizontal orientation.
Figure 5:
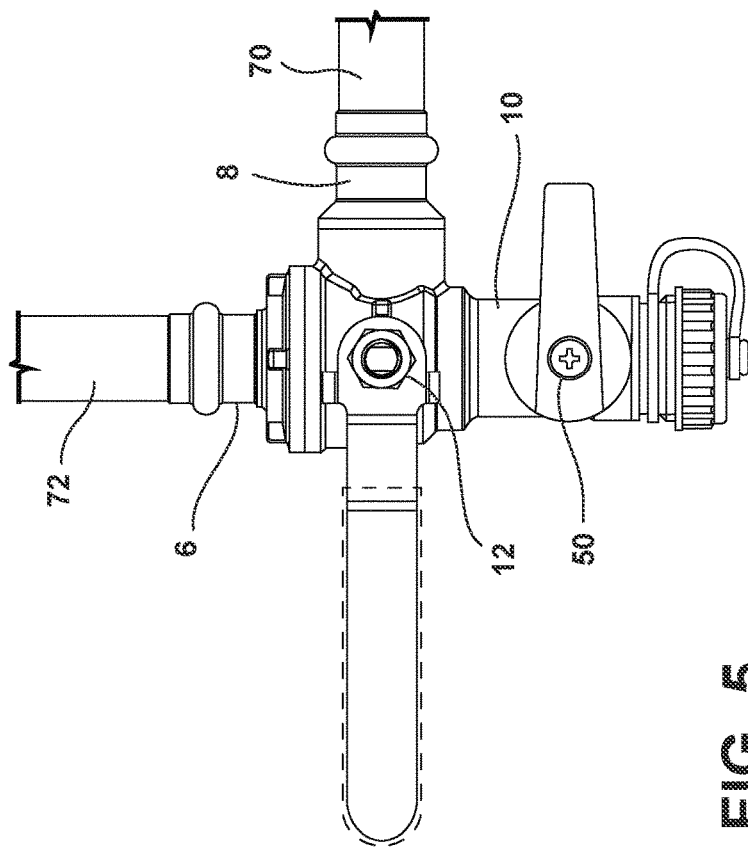
FIG. 5 is a front view of the 3-way T-flow ball drain valve of FIG. 1 shown connected to pipes, with the drain port oriented in a generally vertical orientation.

The orientation of the isolation valve assembly 2 with the end of line drain port 10 can allow for the draining/filling/purging in either a horizontal or vertical installation position. FIG. 4 illustrates the front view the isolation valve 2 wherein the drain port 10 is in a generally horizontal orientation, while FIG. 5 illustrates drain port 10 in a generally vertical position. The positioning of the drain port 10 on an end of the tee-shaped valve body 4 permits end of line draining/filling/purging of a hydronic or plumbing system. This can be used, for example, at the end of a header assembly or branch line, in either a horizontal or vertical position without the need for multiple valve and fitting installations. The drain valve member 50 can be opened and closed when the draining/filling/purging is desired and the first valve member 12 is in the second or third position. Being able to select the second or third position allows for the selection of the draining/filling/purging through either the first fitting end 6 (P2) or the second fitting end 8 (P3).

Figure 6:
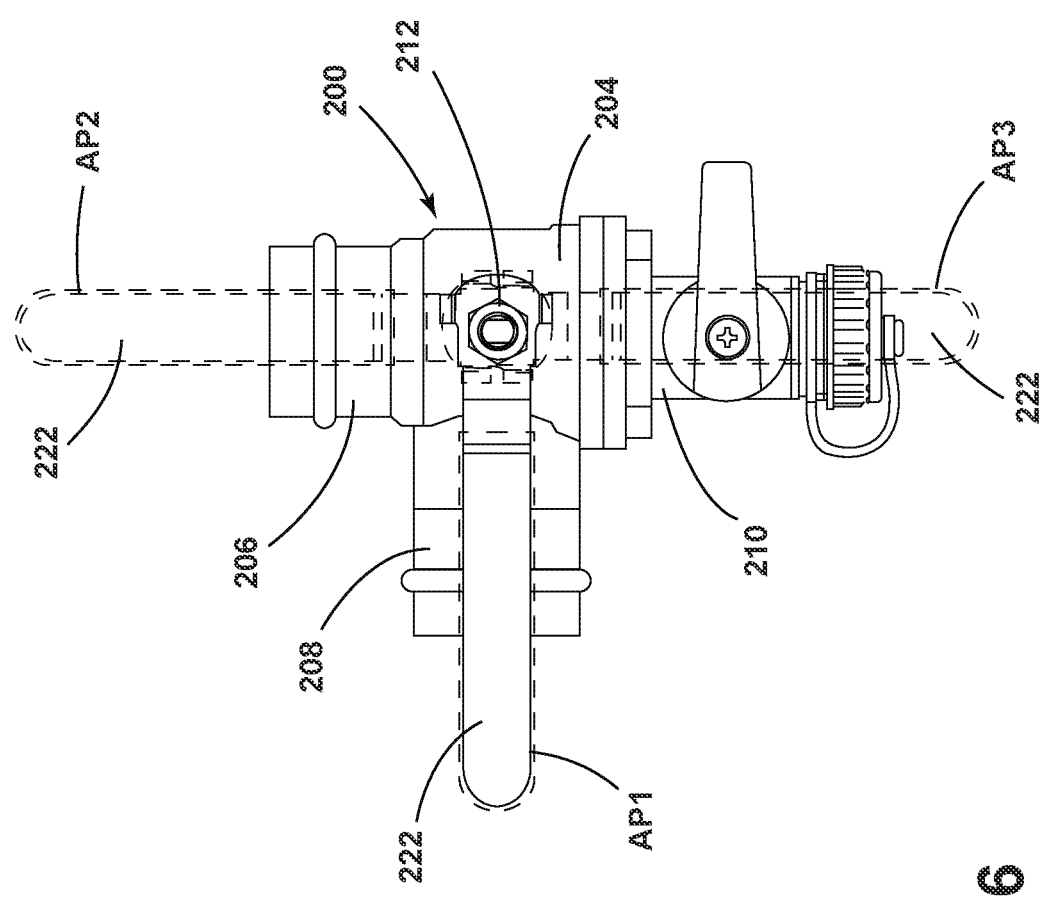
FIG. 6 is a front view of another embodiment of a 3-way T-flow ball drain valve illustrating alternative positions of the valve handle.

Another embodiment of an isolation valve assembly 200 is shown in FIG. 6. The positioning of the ball (not shown) for the T-ball valve 212 permits the first fitting end 206, the second fitting end 208, and the drain port 210 to all be open when the handle 222 is in a first position (AP1). This permits the draining of both the main run and branch simultaneously. When the ball of the T-ball valve 212 is in the first position, the closed side of the ball (the side with no opening in the ball) will be positioned toward the wall of the valve assembly 200 that is opposite the second fitting end 208. When the T-ball valve 212 is in a second position (AP2), the closed side of the ball will be positioned toward the drain port 210. When the T-ball valve 212 is in a third position (AP3), the closed side of the ball will be positioned toward the first fitting end 206. This permits flow between the second fitting end 208 and the drain port 210, while closing all flow to the first fitting end 206. The isolation valve assembly 200 can also be configured to have the closed side of the ball positioned toward the second fitting end 208 (not shown).

A pipe 72 is connected to the first fitting end 6 and a pipe 70 is connected to the second fitting end 8. As illustrated in FIGS. 4 and 5, regardless of the orientation of the isolation valve assembly 2, the positioning of the drain port 10 permits end of line draining/filling/purging in either a vertical or horizontal manner, depending upon the installation. If the drain port 10 were positioned on the middle portion of the tee-shaped valve body 4, the drain port 10 would not be able to provide end of line draining/filling/purging. The end of line draining/filling/purging permits more complete and quicker draining/filling/purging of a larger segment of the associated plumbing and components attached to the plumbing.

While the illustrated embodiments show pipes 70, 72 the same size, different sized pipes can be utilized for the first fitting end 6 and the second fitting end 8. Similarly, different types of pipes 70, 72 can be utilized, depending upon the fitting for first fitting end 6 and second fitting end 8. While the illustrated embodiments show first fitting end 6 and second fitting end 8 having the same type of fitting, different fittings and sizes of fittings can be used for the first fitting end 6 and second fitting end 8.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. In addition, while certain embodiments have shown threaded connections, the threaded connections could include tape or other sealing material in the threaded connection. In addition, the threaded connection could be replaced by other suitable connections or couplings, such as compression couplings or other couplings.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the afore-mentioned structures and methods without departing from the concepts of the present invention, and further it is to be understood that such concepts are intended to be covered by the following claims unless these claims by their language expressly state otherwise.

The invention claimed is:
1. An isolation valve, comprising:
  a tee-shaped valve body having a first fitting end, a second fitting end, and a drain port, wherein said second fitting end is disposed approximately 90° from said first fitting end and said drain port, and said drain port is located approximately 180° from said first fitting end;
  a first valve member with a flow diversion member located in the fluid passageway of said tee-shaped valve body;
    wherein said first valve member opens said fluid passageway therebetween said first fitting end and said second fitting end, while closing the fluid passageway between said drain port and both said first fitting end and said second fitting end when said first valve member is in a first position;
    wherein said first valve member closes said fluid passageway between said second fitting end and both of said first fitting end and said drain port, while opening the fluid passageway between said first fitting end and said drain port when said first valve member is in a second position;
    wherein said first valve member closes said fluid passageway between said first fitting end and both of said second fitting end and said drain port, while opening the fluid passageway between said second fitting end and said drain port when said first valve member is in a third position; and a second valve member with a flow diversion member located between said first valve member and the end of said drain port.

2. The isolation valve of claim 1, wherein said first valve member is a T-ball valve.

3. The isolation valve of claim 1, wherein said drain port has a capped end.

4. The isolation valve of claim 1, wherein said tee-shaped valve body is a unitary piece.

5. The isolation valve of claim 1, wherein said first fitting end and said second fitting end are the same type of fitting.

6. The isolation valve of claim 1, wherein said tee-shaped valve body is made from a material that includes brass.

7. The isolation valve of claim 1, wherein said second valve member is a ball valve.

8. A T-ball valve assembly, comprising:
   a tee-shaped valve body having a first fitting end, a second fitting end, and a drain port, wherein said second fitting end is in the middle of said tee-shaped valve body and said first fitting end and said drain port are on opposite sides of said tee-shaped valve body;
   a T-ball valve member with a flow diversion member located in the fluid passageway of said tee-shaped valve body;
      wherein said T-ball valve member opens said fluid passageway between said first fitting end and said second fitting end while closing the fluid passageway between said drain port and both said first fitting end and said second fitting end when said T-ball valve member is in a first position;
      wherein said T-ball valve member closes said fluid passageway between said second fitting end and both of said first fitting end and said drain port, while opening the fluid passageway between said first fitting end and said drain port when said T-ball valve member is in a second position;
      wherein said T-ball valve member closes said fluid passageway between said first fitting end and both of said second fitting end and said drain port, while opening the fluid passageway between said second fitting end and said drain port when said first T-ball member is in a third position; and
   a second valve member with a flow diversion member located between said T-ball valve member and the end of said drain port.

9. The T-ball valve assembly of claim 8, wherein said tee-shaped valve body is a unitary piece of metal.

10. The T-ball valve assembly of claim 8, wherein said drain port includes a threaded capped end.

11. The T-ball valve assembly of claim 8, wherein said first fitting end is a press-fitting.

12. The T-ball valve assembly of claim 8, wherein said second fitting end is a press-fitting.

13. A piping assembly with a T-ball valve assembly, comprising:
   a tee-shaped valve body having a first fitting end, a second fitting end, and a drain port, wherein said second fitting end is in the middle of said tee-shaped valve body and said first fitting end and said drain port are on opposite sides of said tee-shaped valve body;
   a T-ball valve member with a flow diversion member located in the fluid passageway of said tee-shaped valve body;
      wherein said T-ball valve member opens said fluid passageway between said first fitting end and said second fitting end while closing the fluid passageway between said drain port and both said first fitting end and said second fitting end when said T-ball valve member is in a first position;
      wherein said T-ball valve member closes said fluid passageway between said second fitting end and both of said first fitting end and said drain port, while opening the fluid passageway between said first fitting end and said drain port when said T-ball valve member is in a second position;
      wherein said T-ball valve member closes said fluid passageway between said first fitting end and both of said second fitting end and said drain port, while opening the fluid passageway between said second fitting end and said drain port when said first T-ball member is in a third position;
   a second valve member with a flow diversion member located between said T-ball valve member and the end of said drain port;
   a first pipe coupled to said first fitting end; and
   a second pipe coupled to said second fitting end.

14. The piping assembly with a T-ball valve of claim 13, wherein said tee-shaped valve body is a unitary piece.

15. The piping assembly with a T-ball valve of claim 13, wherein said tee-shaped valve body is made from a material including brass.

16. The piping assembly with a T-ball valve of claim 13, wherein said first pipe has a different diameter than said second pipe.

17. The piping assembly with a T-ball valve of claim 13, wherein said first fitting end and said second fitting end are different types of fittings.

18. The piping assembly with a T-ball valve of claim 13, wherein said first fitting end and said second fitting end are the same type of fitting.

19. The piping assembly with a T-ball valve of claim 13, wherein said drain port includes a cap.

20. The piping assembly with a T-ball valve of claim 13, wherein said drain port includes external threading.

* * * * *